Oct. 15, 1963   R. J. DEMAISON   3,106,756
LIGHT WEIGHT INGOT CASTING MOLD HOT TOPS AND COVERS
Filed Dec. 21, 1960   10 Sheets-Sheet 1

Fig.1.

INVENTOR
R. J. DEMAISON
BY
Morrison, Kennedy & Campbell
ATTORNEYS Oct. 15, 1963  R. J. DEMAISON  3,106,756
LIGHT WEIGHT INGOT CASTING MOLD HOT TOPS AND COVERS
Filed Dec. 21, 1960  10 Sheets-Sheet 7

INVENTOR
R.J. DEMAISON
BY
ATTORNEYS:

Oct. 15, 1963          R. J. DEMAISON          3,106,756

LIGHT WEIGHT INGOT CASTING MOLD HOT TOPS AND COVERS

Filed Dec. 21, 1960          10 Sheets-Sheet 8

INVENTOR
R. J. DEMAISON
BY
ATTORNEYS

Oct. 15, 1963    R. J. DEMAISON    3,106,756
LIGHT WEIGHT INGOT CASTING MOLD HOT TOPS AND COVERS
Filed Dec. 21, 1960    10 Sheets-Sheet 9

INVENTOR
R. J. DEMAISON
BY
Morison, Kennedy & Campbell
ATTORNEYS

United States Patent Office 3,106,756
Patented Oct. 15, 1963

3,106,756
LIGHT WEIGHT INGOT CASTING MOLD
HOT TOPS AND COVERS
Raymond J. Demaison, Bronx, N.Y., assignor to Quigley
Company, Inc., a corporation of New York
Filed Dec. 21, 1960, Ser. No. 77,460
5 Claims. (Cl. 22—147)

This invention relates to low volume sinkheads and to hot-top apparatus for the production of ingots with sinkheads of such character. More particularly, the invention relates to the art of hot-topping which insures the continuous feeding of hot cast metal into the ingots, and is concerned directly with the efficient and continuous feeding of such hot metal by the use of smaller amounts of feed metal made possible by controlling the heat losses in said hot tops.

In particular this invention relates to hot tops, linings for hot tops, covers for hot tops, and the sealing of the space between the hot tops and molds. In addition, it relates to a cheap method of forming and producing hot tops and linings which, due to their operating temperature and characteristics, furnish a means for controlling the rate of heat flow from the hot top so as thus to result in the necessity of a much smaller sinkhead and an increased production of good products from the ingots obtained.

It is common practice in the production of killed steel ingots to place a suitable hot top on each ingot mold to confine the shrinkage cavity to a sinkhead at the top of the ingot and thus minimize the amount of steel that must be discarded in the rolling mill in order to produce products therefrom that are free from pipe and excessive chemical segregation. The prime function of the hot top is therefore to supply a well of molten metal to the solidifying ingot as the metal in the ingot freezes and shrinks in volume. The hot top itself has a limited efficiency which is dependent upon a number of factors but it must be remembered that upon the final solidification of the ingot there is still metal in the hot top which cannot be used and must therefore be discarded.

In the art today it is well recognized that hot top efficiency can be improved by using either refractory linings with normal porosities, such as firebrick or castables, or by using high porosity refractories, such as insulating firebrick, both of which will have a lower insulating factor and have a higher specific heat than the materials used herein.

It is therefore a prime feature of this invention to provide a preformed mat of suitable high temperature refractory mineral wool fibers which will have lower heat storage and lower heat transfer properties so as thereby to reduce and control heat losses. The invention also contemplates a method of prefabricating mats for hot tops and covers which will produce more efficient and smaller hot tops with resultant smaller volume sinkheads and thus result in a greater percentage of the ingot weight being convertible into sound products, with a decrease in the loss of metal in the sinkhead contained in the hot top. The thickness and the density of the mats as well as the fiber diameter can be varied to further control the flow of heat therethrough.

One object of the invention is to provide a hot top which is very light in weight and very economical to make and use and one which is so cheap that it may be discarded after one use if so desired and in addition be so designed and prefabricated that it is simple to assemble and place in a hot top as a lining or used as a hot top itself. A still further object of the invention is to make it possible to seal the space between the hot top and the mold after the hot top is in place and thus prevent the formation of fins in this area. In this connection, it may be stated that the width of the shelf that results from the instant hot top on the ingot will be kept to a minimum as the material thickness necessary to control the heat is considerably less than with any other medium available in the prior art to date. The end result is to insure good products from the ingot on rolling by preventing fissure formation at this point.

In the prior art, the normal weight of firebrick and castables will be approximately 125# to 135# per cubic foot while the insulating firebrick will run from 45# to 80# per cubic foot, whereas the preformed mats used herein will run in the neighborhood of from 4# to 10# per cubic foot and will furnish a means for producing lighter easier-to-handle hot tops at a much lower cost and still provide a better heat control than is now possible in the prior art.

The instant invention is therefore predicated on the preforming of mats of suitable high temperature refractory mineral wool fibers in a continuous process, such as by the use of the forming machine disclosed in Patent No. 2,731,889, issued January 24, 1956, in which the fibers are suspended in water and formed into mats in the machine by using air to result in a strong square sheet (equal strength in both directions) of laminated fibers which may then be used by itself or backed up with a wire mesh, if desired, to insure its staying in a predetermined form once it is bent into shape. The form may then be bound with steel bands or wires to thus result in prefabricated hot tops in useable form. As an alternative, the mats may be made in the form of suitably sized panels for insertion into shells made of steel, cast iron, etc. or as covers to be placed over the hot tops after teeming to control the heat flow and solidification of the metal therein. One of the many mineral fibers that can be used is basalt-wool which is made from basalt rock (a form of lava) and may be produced as either an amorphous fiber or crystalline fiber. Some of the mineral fibers are of lengths from 3' to 5'. Those in the amorphous type category of fibers are good up to 2400° F., while those in the crystalline category of fibers are good up to 1700° F.; moreover, the amorphous fibers are of a non-hygroscopic nature which is of extreme importance. It is also possible to use amorphous and crystalline fibers of alumina and/or silica by themselves or in combination with the basalt-wool as desired. Amorphous and crystalline type fibers of other high temperature melting point metallic oxide fibers may also be used, either alone or in suitable combination with the other fibers specified herein. While the mats may be air-formed in a continuous process with or without the wire mesh backing if so desired, it must be remembered that the air blowing does not produce a mat with the strength nor the even densities that can be obtained from the water-air media. In the forming of the mats, different binders and cements, such as are commonly known and used in the art today, may be added in order to provide a stiffer mat where deemed necessary. The mats may be made of any thicknesses and densities desired or may be laminated and they may, in addition, be stitched to the wire mesh backing in order to insure rigidness for handling and retention in place during teeming.

It is now obvious that, by the use of such preformed mats and panels formed into a suitably shaped body to be used as a hot top or lining for a hot top, the rate of heat loss may be reduced from 7 to 10 times of that obtained by the use of firebrick, depending on the fiber diameters and the mat densities and thicknesses employed. It is also now apparent that in such instances the ingot will solidify much sooner than the sinkhead and much of the remaining heat will be passed back down into the ingot. With this situation prevailing, it is therefore possible to reduce the sinkhead and hot top volume to a point where there is only enough heat in the well to maintain the feeding of molten metal from said well until completion of the solidification of the metal contained in the ingot. It is also possible to control hot top volume to a point where solidification will be controlled in order to also control complete chemical actions, oxidation or any other action desired in the ingot.

If stiffness and further protection is desired, it is feasible to trowel or spray onto the inside faces of the molded bodies of hot tops, after they have been completely formed and ready for use, a coating of a suitable light weight refractory material, or a parting compound. This material will thus form a covering over the whole inside area and the fibrous mineral wool backing will provide a means for the escape of the vapors generated by the drying out of the coating. If further stiffness is desired and deemed necessary, the inside face may be lined with a diamond shaped expanded metal mesh stitched to the preformed mat and a light weight refractory coating applied thereon.

A resumé of the disclosures to be made herein to be used in forming the shaped bodies of the hot tops or linings is as follows:

(1) Plain mineral wool fibers (air formed or water formed).

(2) Plain mineral wool fibers with suitable binders for stiffening.

(3) Plain mineral wool fibers with externally applied wire mesh backing.

(4) Plain mineral wool fibers with suitable binders for stiffening and with externally applied wire mesh backing.

(5) Plain mineral wool fibers with externally applied wire mesh backing and facing.

(6) Plain mineral wool fibers with suitable binders for stiffening with externally applied wire mesh backing and facing.

(7) Plain mineral wool fibers with externally applied wire mesh backing and facing and with a high temperature refractory coating applied on said facing (trowelled or sprayed on).

(8) Plain mineral wool fibers with suitable binders for stiffening with externally applied wire mesh backing and facing and with a high temperature refractory coating applied on said facing (trowelled or sprayed on).

In disclosures 3 to 8 above, stitching may be used to insure the retention of the fibers on the backing and, where backing and facings are used, to tie the components into a unitary whole and thus insure the stiffness necessary to maintain alignment in place.

The mineral wool fibers that are to be used in their preferred form will also now be disclosed as follows:

(1) High temperature refractory mineral wool fibers of suitable length and diameter from basalt rock. Operating temperatures up to 2400° F.

(2) High temperature refractory mineral wool fibers of suitable length and diameter predominantly from alumina and/or silica. Operating temperatures up to 3000° F.

(3) High temperature refractory mineral wool fibers of suitable length and diameter from other high melting point metallic oxides. Operating temperatures above 3000° F.

*Examples*

Zirconium—Melting temperature 2720° C.—4928° F.
Boron—Melting temperature 2800° C.—5072° F.
Beryllium oxide—Melting temperature 2450° C.—4442° F.

(4) High temperature refractory mineral wool fibers of suitable length and diameter from any combination of the above stated fibers. Operating temperatures as needed.

From the foregoing table, it can readily be seen that the basalt wool fibers of proper length, diameter and operating temperatures can be used for the teeming of steel or other metals. This fiber can now be produced for a very low cost in comparison with other high temperature refractory mineral wool fibers and therefore will form the basis of a method of producing the disclosures made herein in economical form.

Reference will now be made to the accompanying drawings which form part of this specification and in which.

Figure 1:
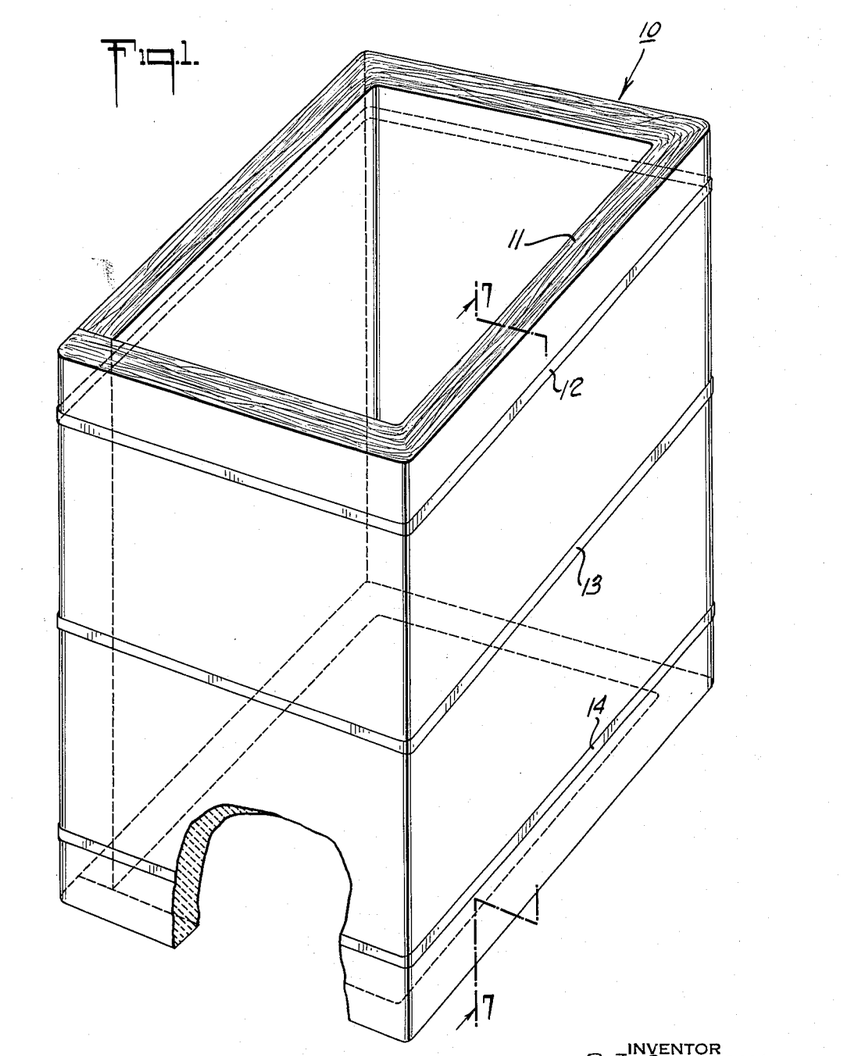
FIG. 1 is a perspective view of the shaped body of a hot top according to one version of the invention.

Referring to the drawings:

In FIG. 1 is shown a perspective view of the shaped body of a hot top 10 completely formed of a preformed mineral wool fiber mat 11 which has been formed over a mold and bound with metal retaining straps or wires 12, 13 and 14 to thus retain it in its preset form and insure its shape retention upon teeming. The preformed mat of suitable mineral wool fibers may be produced either by means of a forming machine or by use of continuous air blowing forming equipment and, in some instances, suitable binders may be added in the forming machine for dispersion in the water and formed with the sheet or sprayed on air blown mats to add to the stiffness of the mats. When the mats are air blown, a secondary operation will have to be employed in which the binders may be sprayed upon the mats.

Figure 2:
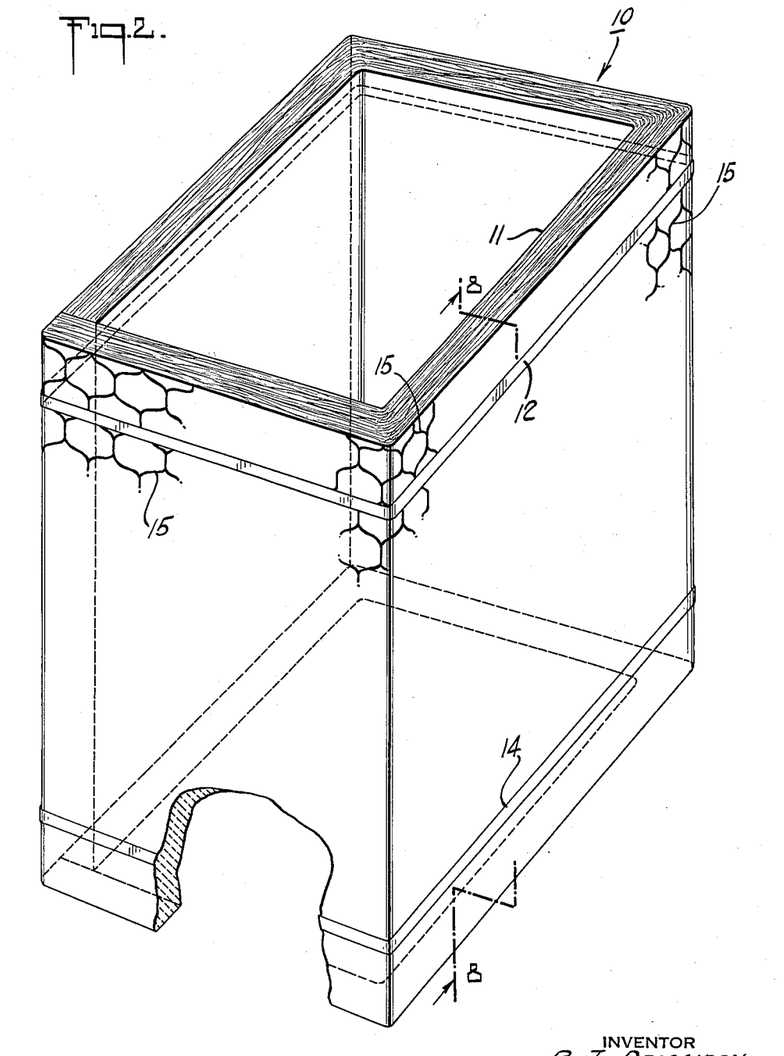
FIG. 2 is a perspective view of the shaped body of a hot top according to another version.

In FIG. 2 is shown a perspective view of the shaped body of a hot top 10 completely formed of a preformed mineral wool fiber mat 11 with a wire mesh backing 15 which has been formed and molded over a suitable mold and bound with metal retaining straps or wires 12 and 14 to thus retain it in its preset form and insure its shape retention on teeming. In this disclosure, the mineral wool fiber mats are preformed and then wire mesh backed, and it is possible if extreme rigidity and shape retention is desired to stitch the mat to the wire mesh backing.

Figure 3:
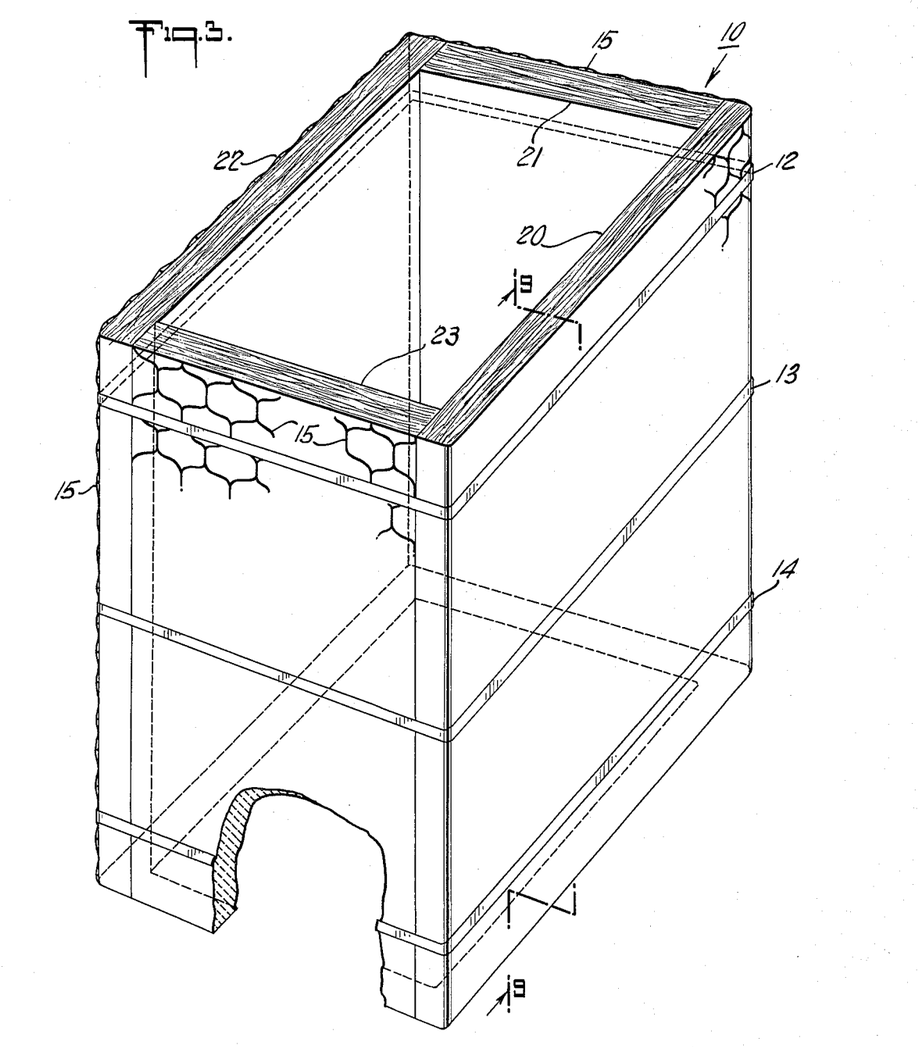
FIG. 3 is a perspective view of the shaped body of a hot top according to still another version.

In FIG. 3 is shown a perspective view of the shaped body of a hot top 10 completely formed by the use of four prefabricated panels 20, 21, 22 and 23, each panel being a precut and sized mineral wool fiber mat with a wire mesh backing 15, and then placing the panels over a suitable mold and binding them into final form by the use of metal retaining straps or wires 12, 13 and 14 to thus retain it in its final form and insure its shape retention upon teeming. In this disclosure stitching may again be used if desired to insure rigidity and shape retention.

Figure 4:
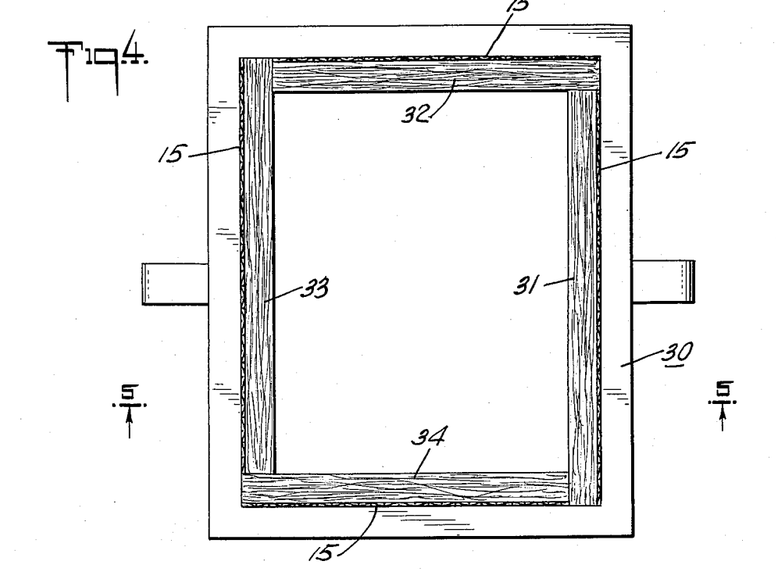
FIG. 4 is a top view of a standard cast iron or steel hot top in which has been inserted four prefabricated and cut panels made according to the invention.

In FIG. 4 is shown a top view of a standard cast iron or steel hot top 30 in which has been inserted four prefabricated and trimmed panels 31, 32, 33 and 34 formed of mineral wool fiber mats with wire mesh backing 15 and binders added for stiffness. In this disclosure, it can readily be seen how the four panels will be held in place in the hot top 30 due to their interlocked ends. The panels used herein may be made with a light or heavy wire mesh backing with or without stitching and they may even be made of plain mats formed with suitable binders and held in place in the hot tops by cements placed on the backs of the mats or on the inside of the hot top.

Figure 5:
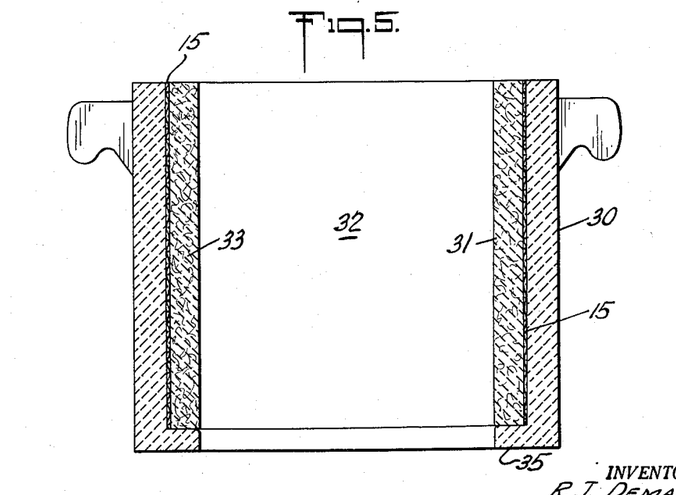
FIG. 5 is a section through the hot top shown in FIG. 4 along the lines 5—5.

FIG. 5 is a section through the hot top 30 shown in FIG. 4 taken along the line 5—5 and shows the panels 31 and 33 in place in the sides and the panel 32 in the end. It will be noted that the panels 31, 32 and 33 are all supported and held up in place by the lip 35. This is also true of panel 34 which is not shown in this view. In hot tops where there is no bottom lip provided, the preformed panels may be held in place by cements or by clips or wires as is now practiced in the present art. In addition, if the space between the hot top and the mold is too large to seal, a flat rectangular mat without or with a wire mesh backing may be placed beneath the hot top and fastened thereto and thus seal off this area and insure no fin formation. If the hot top has no bottom lip, the mats may be extended downward below the lower edge of the hot top and folded up over the outside face on insertion of the hot top into the mold and thus insure sealing also.

Figures 6, 7, 8, 9:
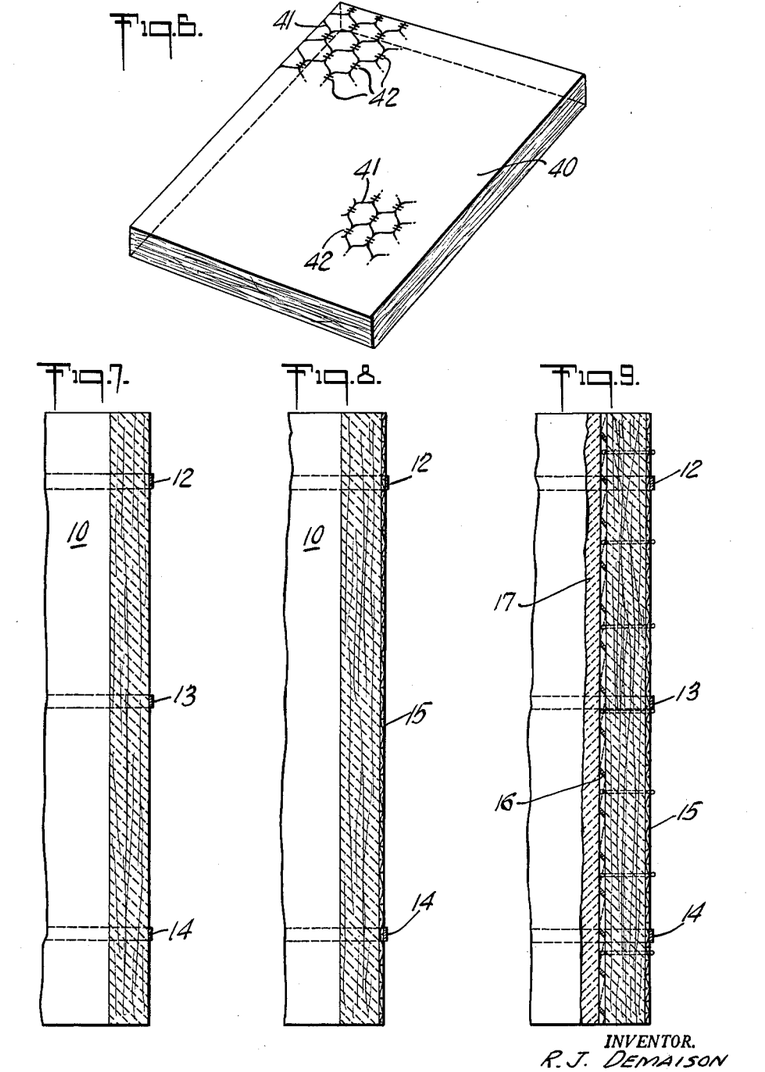
FIG. 6 is a perspective view of a prefabricated and trimmed hot top cover formed from a mineral wool fiber mat with binders and with a wire backing.
FIG. 7 is a section through the hot top shown in FIG. 1 along the lines 7—7.
FIG. 8 is a section through the hot top shown in FIG. 2 along the lines 8—8.
FIG. 9 is a section through the hot top shown in FIG. 3 along the lines 9—9 but with the added diamond shaped expanded wire mesh on the front face.

In FIG. 6 is shown a perspective view of a prefabricated and trimmed hot top cover 40 formed of a mineral wool fiber mat with wire mesh backing 41. In this instance, the wire mesh backing will be stitched as at 42 to the mat and will thus be retained thereby to preclude the cover remaining on top of the hot top and not sink donw into the sinkhead. If it is deemed necessary in order to further control the heat losses with the cover, the mat may be formed with the wire mesh on the back and the diamond shaped expanded metal mesh on the face stitched together and sprayed or trowelled with a light weight refractory material. It must be remembered that these mats may be made in various densities and thicknesses to thus control the heat losses.

FIG. 7 is a section through the hot top 10 formed of a single mineral wool fiber mat shown in FIG. 1 along the line 7—7 and clearly shows the mat with its three metal retaining straps 12, 13 and 14 in place to thus retain the hot top in shape.

FIG. 8 is a section through the hot top 10 formed of a single mineral wool fiber mat with a wire mesh backing shown in FIG. 2 along the line 8—8 and again clearly shows the wire mesh backing 15 on the back side of the mat and the two metal retaining straps 12 and 14 in place to thus hold the hot top in shape.

FIG. 9 is a section through the hot top 10 formed of four prefabricated panels, each panel being a mineral wool fiber mat with a wire mesh backing as shown in FIG. 3, but here has been added a further version that may be used on this basic unit and which consists of adding the diamond shaped expanded metal mesh facing 16 and the high temperature refractory coating 17 placed thereon. It will also be noted that the wire mesh backing 15 has been stitched to the metal mesh 16 on the face to thus hold the mesh thereon and in addition preclude separation. It may be stated here that the high temperature refractory coatings may be used on any of the disclosed units and in all cases this coating may be applied by spraying or trowelling. In addition, it may be added that there will be no problems with vapors emanating from the coating on teeming as the porous mats will furnish all the interstices necessary for vapor emission throughout its length and depth.

Figure 10:
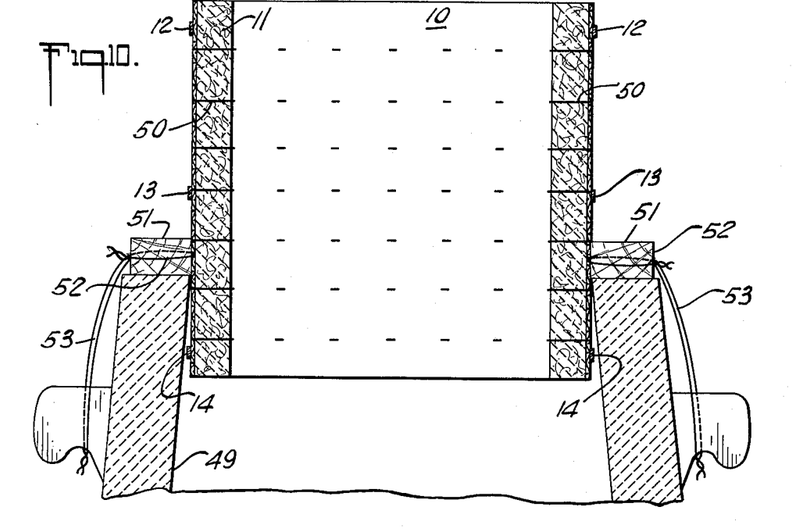
FIG. 10 is a section through the shaped body of a typical hot top in place on the mold. The hot top is formed of a mineral wool fiber mat stitched to a wire mesh backing.

In FIG. 10 is shown a section through the shaped body of a hot top 10 completely formed of a preformed mineral wool fiber mat 11 of suitable thickness and density to control the flow of heat therethrough with a wire mesh backing 15 which has been formed and molded over a suitable mold and bound with metal retaining bands or wires 12, 13 and 14 to thus retain it in its preset form and insure its shape retention on teeming. In this disclosure, the mat 11 is stitched to the wire mesh backing by means of stitches 50 at suitable intervals to insure its remaining in place. It will be noted that the hot top 10 is suitably supported in place on the mold 49 by means of blocks 51 wired to the hot top 10 by means of wires 52 suitably placed to so position the hot top in the mold as to result in a sinkhead of low volume; and, if deemed necesary, the whole assembly may be held down in place on top of the mold by means of the wires 53 placed around the lifting ears of the mold.

Figure 11:
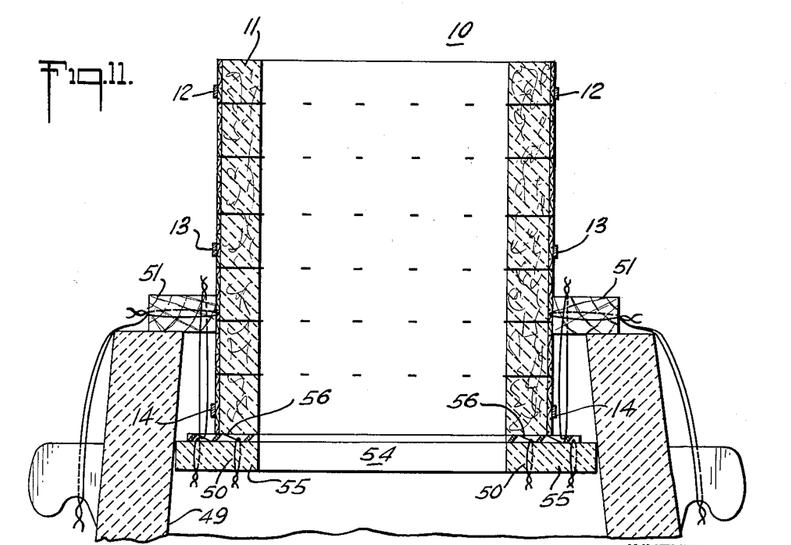
FIG. 11 is a section through the shaped body of a typical hot top placed on a mold. This figure discloses one method of sealing the space between the hot top and the mold by means of a flat sealing ring formed of a mineral wool fiber mat wired up into place after the hot top is placed in the mold.

In FIG. 11 is shown one version of sealing the space between the hot top 10 and the mold, and the section through the hot top discloses that it is completely formed of a preformed mineral wool fiber mat 11 of suitable thickness and density to control the flow of heat therethrough with a wire mesh backing 15 suitably stitched and which has been formed and molded over a suitabe mold and bound with metal retaining bands or wires 12, 13 and 14 to thus retain it in its preset form and insure its shape retention. On the bottom of the hot top 10 after it has been installed in place in the mold, there is placed a flat sealing ring 54 which is formed by taking a flat mineral wool fiber mat 55 suitably contoured to fit over the bottom of the hot top and extend outwardly and fill in the space between the hot top and the mold and placing over this mat a suitable precut wire mesh backing 56 to which the mat 55 is stitched, as at 50, and then the whole assembly is dropped into the mold and pulled up and placed on the bottom edge of the hot top by means of wires and thus anchored to the blocks 51 above. Here again it will be noted that the hot top 10 is suitably supported in place on the mold 49 by means of the blocks 51 suitably placed and wired to the hot top 10 by means of the wires 52; and, again if deemed necessary, the whole assembly may be held down in place on the top of the mold by means of the wires 53 placed around the lifting ears of the mold. It is also possible in this disclosure to use the diamond shaped expanded metal mesh on the face of the mat 11 and stitch it to the wire mesh backing and then spray or trowel an insulating refractory coating on the face of the entire hot top.

Figure 12A:
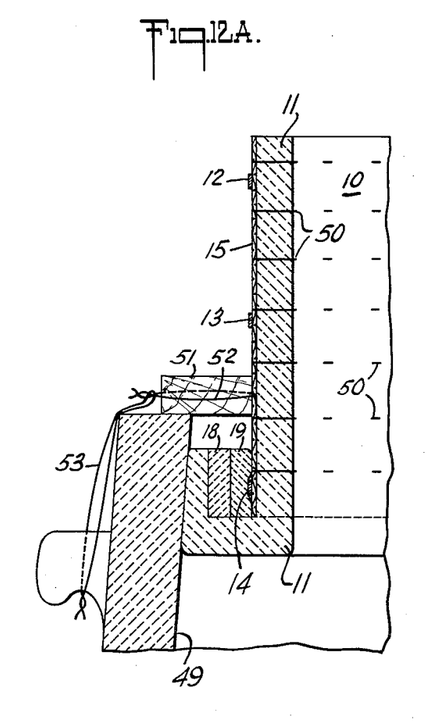
FIG. 12A and FIG. 12B are sections through the shaped body of a typical hot top formed of a mineral wool fiber mat placed on a mold. In this disclosure, the sections are split in the center to thus display two alternate means for sealing the space between the hot top and the mold.
Figure 12B:
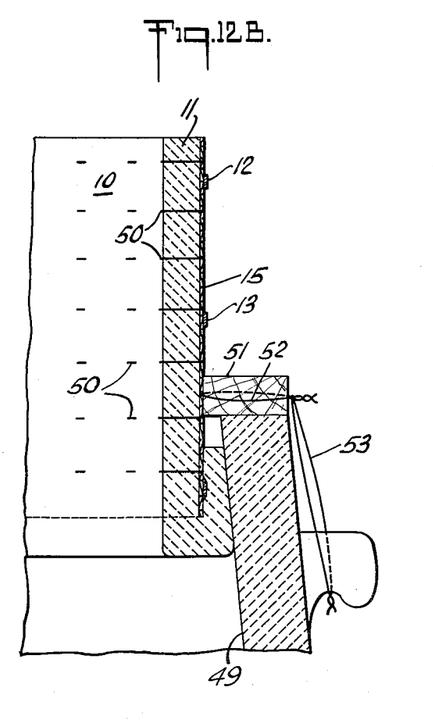

In FIGS. 12A and 12B are shown two other versions of sealing the space between the hot top and the mold. In both figures, the hot tops 10 are completely formed of a preformed mineral wool fiber mat 11 of suitable thickness and density to control the flow of heat therethrough with a wire mesh backing which has been formed and molded over a suitable mold and bound with metal retaining bands or wires 12, 13 and 14 to thus retain it in its preset form and insure its shape retention on teeming. In the disclosure shown in FIG. 12A, the mineral wool fiber mat 11 is secured to the wire mesh backing 15 by means of stitching 50 at suitable intervals to insure its remaining in place and is shown extended at the bottom (with no wire mesh backing or stitching). Due to the fact that the space is so large, it will be necessary to insert a plurality of narrow mineral wool fiber mats 18 and 19 inside the fold-up of the mat 11 when putting the hot top in place to thus insure the sealing off of the space. In the disclosure shown in FIG. 12B, the mineral wool fiber mat 11 is also extended at the bottom (with no wire mesh backing or stitching) to fold up in place on the outside of the hot top as it is put in place in the mold and thus seal the space between the hot top and the mold. It will again be noted that, in both instances, the hot tops 10 are suitably supported in place on the mold 49 by means of the blocks 51 suitably placed on the hot top 10 by means of wires 52 and, if deemed necessary, the whole assembly may be held down in place on the top of the mold by means of wires 53 placed around the lifting ears of the mold.

Figure 13:
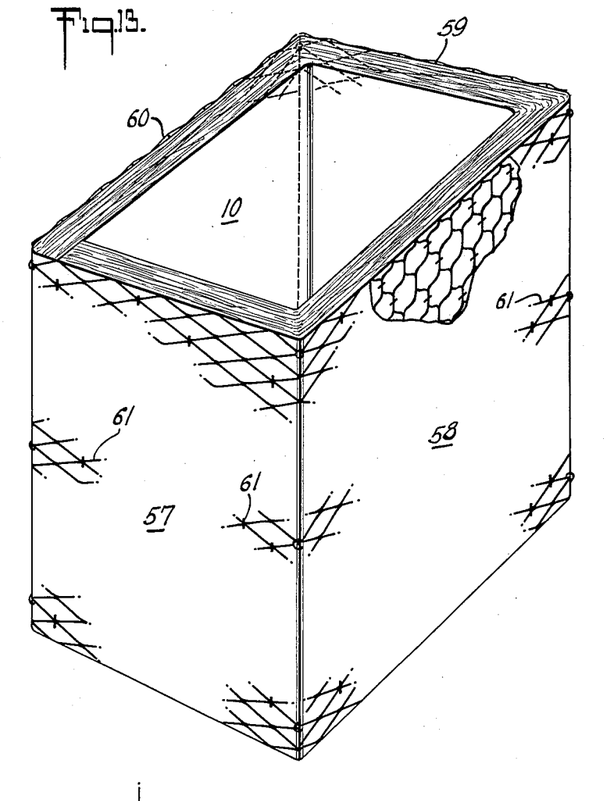
FIG. 13 is a perspective view of the shaped body of a reuseable hot top in the form of a diamond shaped expanded metal mesh shell made up of a plurality of panels lined with mineral wool fiber mats.

In FIG. 13 is shown a perspective view of a reuseable hot top formed of diamond shaped expanded metal mesh shell made up of panels 57, 58, 59 and 60 in which the mineral wool fiber backing is suitably fastened by means of wire ties 61 at suitable intervals. The panels 57, 58, 59 and 60 are so cut, shaped and trimmed as to make it possible to bend the expanded metal through the diamond shaped openings and thus form a plurality of hinges upon which the panels may be completely opened up and laid out on a flat surface for insertion and fastening of the mineral wool fiber mat. The same expanded metal ends may be used to retain the hot top in shape upon assembly. In addition, if it is desired to make a more elaborate shell, the panels of expanded metal mesh may be enclosed in suitable crimped metal enclosures and hinges and clasped to make it operable. Any of the other disclosures for sealing the space between the hot top and the mold and the refractory coatings may be used on this unit, as well as the method of supporting the hot top on the mold.

Figure 14:
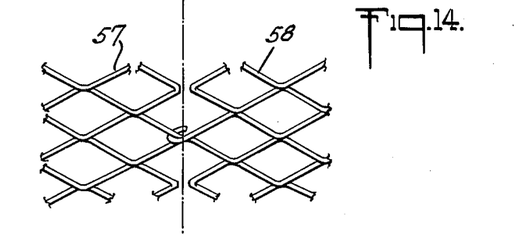
FIG. 14 is a front view of the hinge used on the reuseable hot top shown in FIG. 13.

In FIG. 14 is shown a partial section of the hinge formed between panels 57 and 58 of FIG. 13. The ends of the diamond shaped expanded metal mesh are compresed and passed into the loops of the adjoining panel to thus form a hinge.

Figure 15:
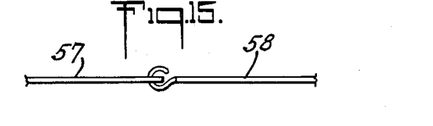
FIG. 15 is a top view of the hinge shown in FIG. 14 and shows more clearly how the ends are bent around to form the hinge means.

FIG. 15 is a top view of the hinge shown in FIG. 14 and simply shows in more detail the formation of the loops.

Figure 16:
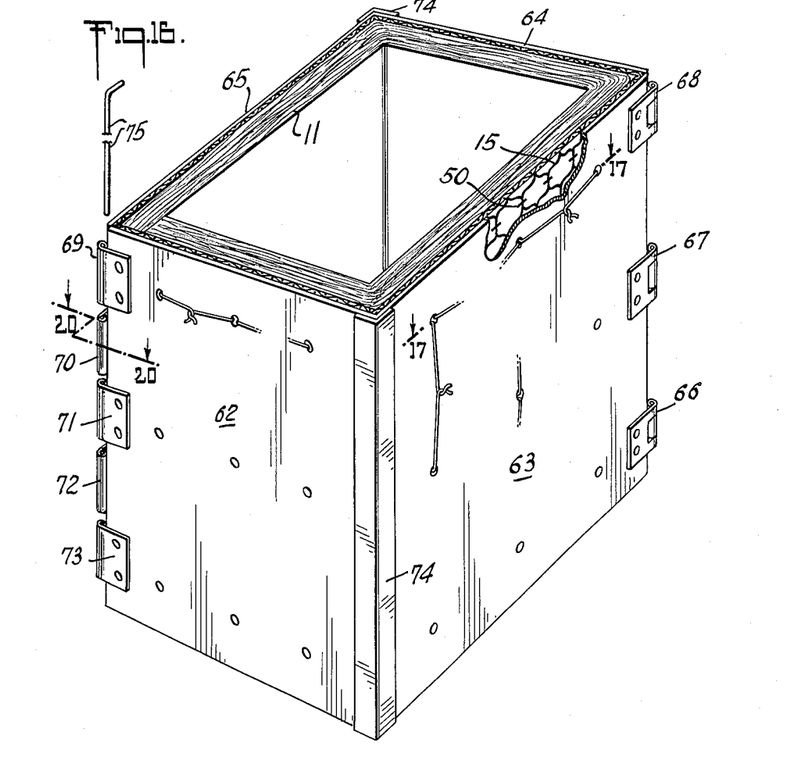
FIG. 16 is a perspective view of a shaped body of another version of a reuseable hot top formed of light weight metal or transite sheet for the shell.

In FIG. 16 is shown a perspective view of another version of a reuseable hot top formed of light weight metal shell containing panels 62, 63, 64 and 65 with a suitable plurality of holes punched or drilled therein to thus provide fastening means for the mineral wool fiber mat 11 as well as the normal anchoring and supporting means used to hold the hot top on the mold. The hot top is actually composed of two sets of panels which are formed at right angles to one another and these angles are then reinforced by means of the angle plates 74 suitably spot welded, riveted or bolted thereon. The hinges 66, 67 and 68 are also spot welded, riveted or bolted in place and the same holds true for the fastening means 69, 71 and 73 on panel 62 and fastening means 70 and 72 on panel 65. The fastening means are simply hinge halves with the pin removed to thus furnish a means for locking the hot top in final form on assembly by means of the long pin 75. In lining the hot top, the pin 75 is removed and the mineral wool fiber mat with its wire mesh back 15 stitched in place as at 50 is placed therein and either wired or stitched in place to the panels and then the panels closed and locked in place. It is also possible to eliminate the use of the hinges as a fastening means if economy is desired by using or forming a turned end on the two panels 62 and 65 or by spot welding sections of tubing thereon and thus still create a means for locking the hot top in shape. If desired, perforated or transite board may be used to fabricate the hot top in a similar manner explained above.

Figure 17:
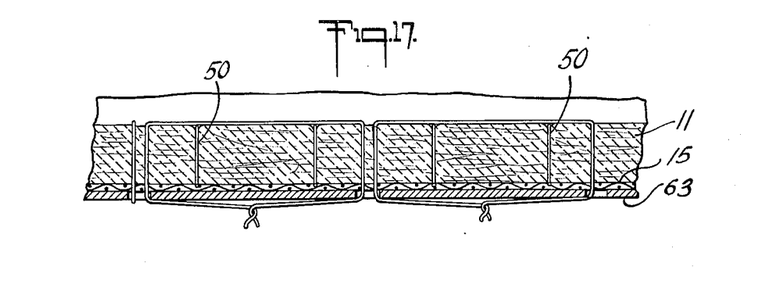
FIG. 17 is a partial section taken along the lines 16—16 of the reuseable hot top shown in FIG. 16.

FIG. 17 is a partial section along the lines 17—17 of FIG. 16 and clearly shows the mineral wool fiber mat 11 with its wire mesh backing 15 thereon stitched together by stitching 50 and then the whole preformed mat suitably wired or stitched in place on panel 63.

Figures 18, 19, 20:
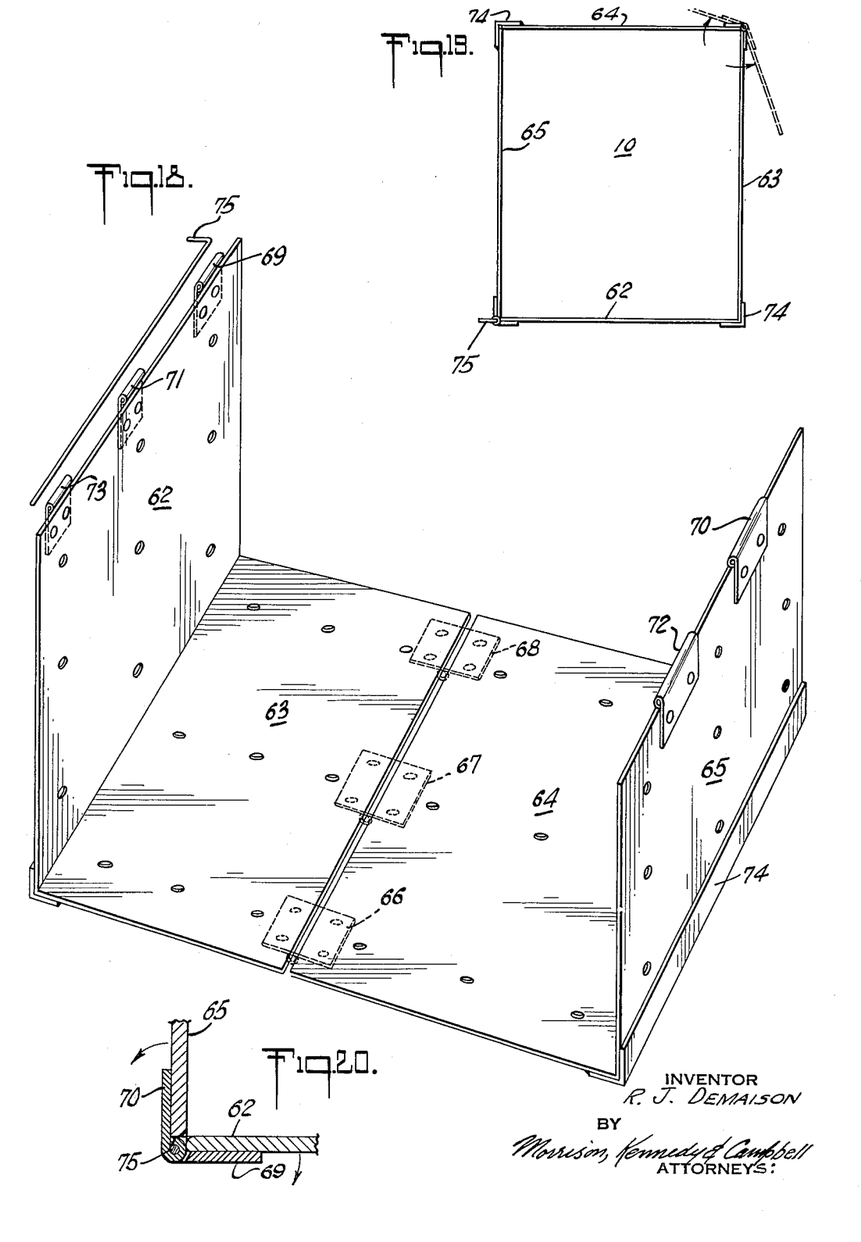
FIG. 18 is a perspective view of the light weight metal or other suitable material shell used in FIG. 16.
FIG. 19 is a top view of the light weight shell shown in FIG. 16 and FIG. 18 in closed and locked position but with no lining in place therein.
FIG. 20 is a top view of the locking pin arrangement shown in FIG. 16 and FIG. 18 in closed position with pin in place.

In FIG. 18 is shown a perspective view of the reuseable hot top shown in FIG. 16 in open position ready to receive the mineral wool fiber mat 11 therein. It can readily be seen that the light weight panels 62, 63, 64 and 65, with their hinges 66, 67 and 68 and locking means 69, 70, 71, 72 and 73 with the mineral wool fiber mat 11 inserted therein and the pin 75 in place, will result in a very light weight hot top easily handled and readily relined at a very economical cost.

In FIG. 19 is shown a top view of the assembled hot top shown in FIG. 16 without the lining in order to give a better idea of the assembly.

In FIG. 20 is shown a partial view of the locking means with the pin 75 in place of the hot top shown in FIG. 16.

It will now be apparent to anyone familiar with the prior art in this field that the instant invention provides a more economical method of prefabricating hot tops, linings for hot tops, as well as bottom sealing and covers, which may be used once and then thrown away. In addition, the instant invention discloses methods for producing light weight shells for hot tops which may utilize the panels disclosed herein to result in a hot top which may be reused and relined to thus again make it economically possible to cut down costs on hot top repairs and replacements. Moreover, where it is deemed necessary, the inside faces of the instant hot tops may be coated on their inside faces with a light weight high temperature refractory coating. The back faces of the panels may also be coated with any suitable cement for retention in relinable cast iron hot tops or if desired the cement may be placed in the hot top and the panel placed thereover.

It must be remembered that the hot tops disclosed herein may be made very thin in comparison to those now in use and will therefore result in a very narrow step or shelf being produced at the top of the ingot where the sinkhead rises above and beyond the ingot body to thus make it possible to insure a good product from the ingots when they are rolled. It is also possible at this point to seal off the space between the mold and the hot top to prevent the formation of fins and further eliminate reworking the ingot before placing it in the soaking pit.

The overall effect of the complete disclosures contained herein is to give to the steel industry a new and completely different concept in hot topping and a concept which can be fitted into almost any type of operation to result in considerable savings as well as better products with lower losses and greater economies. In order to realize the maximum benefits that may be achieved in practicing the instant invention, there remains the need for good workmanship in hot top preparation, teeming practice and rolling mill discard-practice. It must be remembered also that the disclosures contained herein are only a few of the possibilities of the invention. It should be under-

What is claimed is:

1. A light weight highly porous hot top for use with an ingot casting mold, said hot top comprising a hollow body open at the top and bottom, the wall structure of said body being composed essentially of finely spun high temperature refractory mineral wool fibers bonded together into an integrated mass having a weight of from 4 to 10 pounds per cubic foot and consonant with a predetermined low volume sink head.

2. An ingot casting mold hot top according to claim 1 wherein the integrated mass of mineral wool fibers has reinforcing means to retain it in its required shape.

3. An ingot casting mold hot top according to claim 2, wherein the reinforcing means are applied to the inside face of the integrated mass of mineral wool fibers, and wherein a thin light weight refractory coating is applied over said reinforcing means.

4. An ingot casting mold hot top according to claim 1, wherein the integrated mass of mineral wool fibers is reinforced by an outer metal shell.

5. An ingot casting mold hot top according to claim 1, having a cover composed essentially of finely spun high temperature refractory mineral wool fibers which constitute substantially the sole medium for controlling the rate of heat flow through the cover, said fibers being bonded together as an integrated mass with a density and thickness consonant with a predetermined low volume sink head.

References Cited in the file of this patent

UNITED STATES PATENTS

| | | |
|---|---|---|
| 1,140,601 | Lappen | May 25, 1915 |
| 2,301,101 | Welshans | Nov. 3, 1942 |
| 2,361,386 | Eayrs | Oct. 31, 1944 |
| 2,663,920 | Anthony | Dec. 29, 1953 |